United States Patent Office 3,689,440
Patented Sept. 5, 1972

3,689,440
POLYURETHANE FOAMS PREPARED FROM AROMATIC HYDROXYL-CONTAINING POLYOLS AND POLYISOCYANATES
Orville L. Glaesmann, Lake Jackson, Tex., assignor to The Dow Chemical Company, Midland, Mich.
No Drawing. Filed Oct. 8, 1970, Ser. No. 79,291
Int. Cl. C08g 22/44
U.S. Cl. 260—2.5 AM                 9 Claims

ABSTRACT OF THE DISCLOSURE

The thermal stability of polyurethane foams prepared from polyisocyanates and an aromatic hydroxyl-containing polyol is improved by the addition of an aldehyde or a compound capable of releasing formaldehyde.

This invention relates to cellular polyurethane compositions and more particularly relates to rigid cellular polyurethane foams prepared from aromatic hydroxyl-containing compounds and polyisocyanates, said foams having improved resistance to thermal degradation.

Polyurethane foams prepared from aromatic hydroxyl-containing polyols and polyisocyanates possess excellent fire retardant properties particularly in their resistance to direct flame impingement tests such as the Bureau of Mines flame penetration test discussed and described in an article by Andrews, W.R., Cianciolo, A.D., Miller, E. G. and Thompson, L.W., J. of Cellular Plastics, pp. 102–108, March 1968.

These foams, however, have poor thermal stability or resistance to decomposition by heat such as would be encountered in oven and furnace insulation and the like. Such thermal stabilty is tested by a faced panel test as described in the Journal of Cellular Plastics, vol. 4, No. 1, pp. 22–36, particularly p. 23, by J. N. Tilley, H. G. Nadeau, H. E. Reymore, P. H. Waszeciok and A. A. R. Sayigh.

It has now been discovered that the thermal stability of polyurethane foams prepared from a polyol having a plurality of aromatic hydroxyl groups and a polyisocyanate can be improved by the addition of from about 2 to about 50 and preferably from about 5 to about 20 parts by weight, based upon the combined weights of polyol and polyisocyanate, of an aldehyde or formaldehyde releasing compound.

The formaldehyde releasing compounds which are added to the foam formulation to prepare the foam of the present invention include formaldehyde itself or those compounds which when heated to a temperature of about 70° C. or less will release formaldehyde and includes the cyclic and linear homopolymers of formaldehyde such as, for example, trioxane, paraformaldehyde and the like. Hexamethylene tetramine and tris(hydroxymethyl)nitromethane will also decompose to release formaldehyde.

Aldehydes which may be added to the foam formulation to prepare the foams of the present invention include aliphatic aldehydes such as, for example, acetaldehyde, propionaldehyde, butyraldehyde, glyoxal and the like, heterocyclic aldehydes such as, for example, furfural and the like, aromatic aldehydes such as, for example, benzaldehyde, hydroxybenzaldehyde, and the like.

Since formaldehyde is a gas, it is difficult to handle and requires the use of pressure equipment in order to prepare foams employing it; it is preferred to employ formaldehyde releasing compounds or other aldehydes in preparing the foams of the present invention. Formaldehyde dissolved in a suitable solvent is also a suitable method for incorporating formaldehyde into the foam.

The compounds having a plurality of aromatic hydroxyl groups which are employed as the polyol in the preparation of the urethane foams of the present invention include those represented by the following general formulae

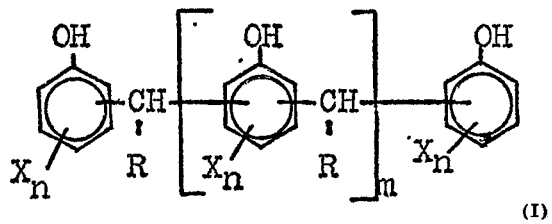

(I)

wherein R is hydrogen or an alkyl radical having from 1 to 3 carbon atoms, X is hydrogen, hydroxyl, chlorine, bromine or an alkyl group having from 1 to 12 carbon atoms, $n$ is an integer from 1 to 2 and $m$ has an average value from about 0.1 to about 4;

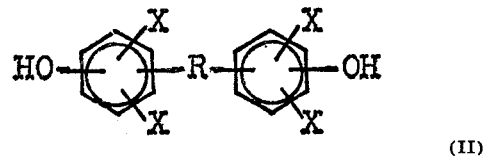

(II)

wherein R is an alkylidene radical having from about 1 to about 8 carbon atoms,

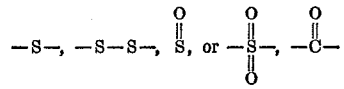

and each X is independently selected from the group consisting of hydrogen, an alkyl group having from 1 to 12 carbon atoms, chlorine and bromine.

Other compounds having a plurality of aromatic hydroxyl groups which are employed to prepare the polyurethane foams of the present invention include the diphenyl ether phenol resins which are the reaction products of a chloromethylated diphenylether having the general formula

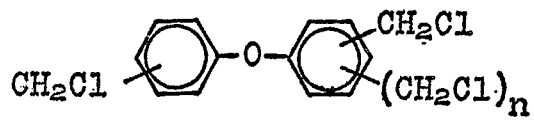

wherein $n$ is an integer from 0 to 1 and a phenol having at least one hydrogen atom in the ortho or para position and the general formula:

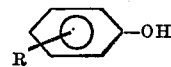

wherein R is hydrogen, chlorine, bromine, cyclohexyl, phenyl or an alkyl radical having from 1 to 12 carbon atoms. These compounds are more fully described in U.S. Pat. 3,128,259.

The polyols containing a plurality of aromatic hydroxyl groups can be employed as the sole hydroxyl-containing compound, or they can be used in admixture or blended with polyether polyols such as the adducts of one or more alkylene oxides having from 2 to 4 carbon atoms such as ethylene oxide, propylene oxide, or butylene oxide, with glycols, glycerol, 1,2,4-butanetriol, 1,2,6-hexanetriol, trimethylolpropane, pentaerythritol, sucrose, hexose, or sorbitol, or with polyols that are adducts of said alkylene oxides and the novolac resins, e.g. novolac polyols, which polyols have hydroxyl numbers in the range of from about 30 to 1200. The compounds containing a plurality of aromatic hydroxyl groups can also be blended or mixed with polyesters containing hydroxyl groups reactive with organic polyisocyanates to form polyester-aromatic ether polyurethane compositions. The compounds containing a plurality of aromatic hydroxyl groups are employed in amounts of from about 10 to about 100 percent by weight and preferably from about 40 to about 90 percent by weight based upon the total weight of material providing active OH groups.

Any organic aryl polyisocyanate can be employed in making the polyurethane compositions of the present invention. The isocyanate may contain two or more isocyanate radicals. Mixtures of the aryl polyisocyanates can be employed. Among representative polyisocyanate compounds are:

toluene-2,4-diisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluoroenediisocyanate,
1,8-naphthalenediisocyanate,
2,6-diisocyanatobenzfuran,
2,4,6-toluenetriisocyanate, and
2,4,4'-triisocyanatodiphenylether.

Other organic polyisocyanates that can be used are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

The organic polyisocyanate compounds which can be used also include the isocyanate-terminated reaction products of an excess of any of the above described polyisocyanates with the polyhydroxy compounds described.

It may be mentioned that the polyurethane foams prepared from the novolac resins and blends of novolac resins and other polyols described herein and polymeric isocyanates such as polymethylene polyphenyl isocyanate (PAPI) possess superior resistance to burning and have better self-extinguishing characteristics than have foams made with the non-polymeric isocyanates e.g. tolylene diisocyanate, under otherwise similar conditions. The polyurethane foams prepared from the novolac resins and polymeric polyisocyanates are a preferred class of product.

In making the polyurethane foams of the invention, the proportions of the polyisocyanate compounds and the proportions of the aromatic hydroxyl-containing polyols, or mixtures of the aromatic hydroxyl-containing polyols, and other polyols or compounds having active hydrogen atoms, can vary widely, but are usually employed in amounts corresponding to from about 0.85 to 2.0, preferably from 1.0 to 1.2 NCO group per active hydrogen atom in the mixture. One can provide water and excess polyisocyanate to form gases capable of expanding the reaction mass to make a foam. However, the polyurethane foams are preferably prepared employing aliphatic hydrocarbons boiling below 110° C. or halogenated aliphatic hydrocarbons boiling below 110° C. such as dichlorodifluoromethane, trichlorofluoromethane, hexane, hexene, or pentane as the blowing or foaming agent. Suitable foaming agents are disclosed in U.S. Pat. No. 3,072,582.

The polyisocyanates are usually employed in an amount in excess of that theoretically required to react with the hydrogen atoms in the sum of the reactants and water in the mixture of materials, preferably in an amount corresponding to from about 1.0 to 1.2 NCO group for each OH and active hydrogen atom in the starting materials.

The polyurethane foams can be prepared by a prepolymer procedure, a one-shot process, or a batchwise technique, all of which methods are known to the art. The cellular products are rigid to semi-rigid foams and have closed or open cells, but usually consist of predominantly closed cells with a minor amount of open or interconnected cels.

In practice, the novolac resin or a mixture of the novolac resin and one or more other polyols or polyesters as hereinbefore described is reacted with a polyisocyanate in a typical urethane recipe. The recipe may employ a catalyst and oftentimes advantageously uses a plurality of catalysts such as an amine catalyst and a metal salt of an organic acid, and a cell regulating agent, together with an appropriate foaming agent such as $CH_2CCl_2$, $CCl_3F$, $CCl_2F_2$, $C_2Cl_2F_2$, $CH_2Cl_2$, $C_2H_4Cl_2$, $CHCl_2F$, $CClF_3$, and $CHClF_2$, or pentane, pentene, hexane, hexene, heptane and the like.

Among suitable catalysts are sodium acetate; amine catalysts such as tetramethylenediamine (TMDA), tetramethyl guanidine (TMG), tetramethyl-1,1,3,3-butanediamine (TMBDA), triethylenediamine ("DABCO"), triethylamine (TEA), dimethylethanolamine, tetramethylethylenediamine (TMEDA), and N-ethyl piperidine; and esters of tin, or tin salts, such as stannous oleate, stannous octoate, and dibutyl tin dilaurate. Mixtures of combinations of any two or more of the catalysts can also be used.

The catalysts can be used in amounts corresponding to from about 0.01 to 5 percent based on the total weight of the sum of the weights of the polyols or hydroxyl-containing compounds initially used.

Among surface active agents or emulsifiers there may be mentioned, polypropylene glycols having molecular weights between about 2000 and 8000, the liquid silicone-glycol copolymers having viscosities from 350 to 3500 centistokes at 77° F., and polysiloxane polyoxyalkylene block copolymers as described in U.S. Pat. No, 2,834,748.

Other compounds which may be included in the foam formulation include viscosity reducing compounds such as, for example, tris(2-chloroethyl)phosphate, dimethyl formamide, triethylphosphate, tributylphosphate, tricresylphosphate, dioxane, acetone, 1,1-dichloroethane and the like.

The following examples are illustrative of the present invention but are not to be construed as to limiting the scope thereof in any manner.

EXAMPLES 1–6

In the following examples and control, all the components except the polyisocyanate were blended together at room temperature; then the polyisocyanate was added and after thorough blending for 8 seconds, the blend was poured into an open mold and the foam allowed to rise freely. The foam formulations are given below:

Control 100 grams triethylphosphate
40 grams tris(2-chloroethyl)phosphate
338 grams of an aromatic hydroxyl-containing polyol which is the acid catalyzed reaction product of phenol and formaldehyde having an aromatic hydroxyl functionality of 3.2 and an OH equivalent weight of 106
8 grams silicone oil (DC 193)

170 grams trichloromonofluoromethane
2 grams dimethylethanolamine
0.4 cc. dibutyltindilaurate
462 grams PAPI (polymethylenepolyphenyl isocyanate having an NCO equivalent weight of 135 and an NCO functionality of 2.6).

Example 1

100 grams triethylphosphate
40 grams tris(2-chloroethyl) phosphate
338 grams of an aromatic hydroxyl-containing polyol which is the acid catalyzed reaction product of phenol and formaldehyde having an aromatic hydroxyl functionality of 3.2 and an OH equivalent weight of 106
8 grams of silicone oil (DC 193)
190 grams trichloromonofluoromethane
160 grams paraformaldehyde
2 grams dimethylethanol amine
0.4 cc. dibutyltindilaurate
462 grams PAPI (polymethylenepolyphenyl isocyanate having an NCO functionality of 2.6 and an NCO equivalent weight of 135).

Example 2

160 grams benzaldehyde
338 grams aromatic hydroxyl-containing polyol which is the acid catalyzed reaction product of phenol and formaldehyde having an aromatic hydroxyl functionality of 3.2 and an OH equivalent weight of 106
8 grams of silicone oil (DC 193)
170 grams trichloromonofluoromethane
2 grams dimethylethanolamine
0.4 cc. dibutyltindilaurate
462 grams PAPI (polymethylenepolyphenyl isocyanate having an NCO functionality of 2.6 and an NCO equivalent weight of 135).

Example 3

40 grams triethylphosphate
40 grams tris(2-chloroethyl)phosphate
80 grams symmetrical trioxane
338 grams aromatic hydroxyl-containing polyol which is the acid catalyzed reaction product of phenol and formaldehyde having an aromatic hydroxyl functionality of 3.2 and an OH equivalent weight of 103.8
8 grams of silicone oil (DC 193)
150 grams trichloromonofluoromethane
2 grams dimethylethanolamine
0.4 cc. dibutyltindilaurate
462 grams PAPI (polymethylenepolyphenyl isocyanate having an NCO functionality of 2.6 and an NCO equivalent weight of 135).

Example 4

100 grams triethyl phosphate
40 grams tris(2-chloroethyl)phosphate
338 grams aromatic hydroxy-containing polyol which is the acid catalyzed reaction product of phenol and formaldehyde having an aromatic hydroxyl functionality of 3.2 and an OH equivalent weight of 106
120 grams symmetrical trioxane
8 grams silicone oil (DC 193)
150 grams trichloromonofluoromethane
2 grams dimethylethanolamine
0.4 cc. dibutyltindilaurate
462 grams PAPI (polymethylene polyphenyl isocyanate having an NCO functionality of 2.6 and an NCO equivalent weight of 135).

Example 5

100 grams triethylphosphate
40 grams tris(2-chloroethyl)phosphate
160 grams benzaldehyde
338 grams aromatic hydroxyl-containing polyol which is the acid catalyzed reaction product of phenol and formaldehyde having an aromatic hydroxyl functionality of 3.2 and an OH equivalent weight of 106
8 grams silicone oil (DC 193)
3 grams dimethylethanolamine
0.4 cc. dibutyltindilaurate
462 grams PAPI (polymethylenepolyphenyl isocyanate having an NCO functionality of 2.6 and an NCO equivalent weight of 135).

Example 6

100 grams triethylphosphate
40 grams tris(2-chloroethyl)phosphate
338 grams aromatic hydroxyl-containing polyol which is the acid catalyzed reaction product of phenol and formaldehyde having an aromatic hydroxyl functionality of 3.2 and an OH equivalent weight of 106
8 grams silicone oil (DC 193)
170 grams trichloromonofluoromethane
16 grams paraformaldehyde
2 grams dimethylethanolamine
0.4 cc. dibutyltindilaurate
462 grams PAPI (polymethylenepolyphenyl isocyanate having an NCO functionality of 2.6 and an NCO equivalent weight of 135).

The properties of the above prepared foams are given in the following Table I.

TABLE I

| Property | Control | Example No. | | | | | |
| --- | --- | --- | --- | --- | --- | --- | --- |
| | | 1 | 2 | 3 | 4 | 5 | 6 |
| Density, p.s.i. | 1.93 | 1.99 | 2.10 | 1.70 | 2.57 | 2.33 | 1.91 |
| Compression strength, p.s.i. | 39.3 | 17.4 | 23.8 | 25 | 10.3 | 15.3 | 34.9 |
| Original K-factor | 0.113 | 0.114 | 0.125 | 0.122 | 0.108 | 0.132 | 0.108 |
| Heat distortion temp., °C | 75–80 | 75–80 | 75–80 | 75–80 | <70 | 85–90 | 75–80 |
| Abrasion resistance percent wt. loss | 1.7 | 15.7 | 5.2 | 2.7 | 4.9 | 14.3 | 2.0 |
| Thermal stability by faced panel test [1] cold side, temp., °F | 250 | 165 | 176 | 197 | 217 | 208 | 219 |
| Time for peak temp., min | 38 | 60 | 60 | 60 | 60 | 60 | 60 |

[1] The thermal stability was obtained by placing a 2″x12″x12″ piece of the foam being tested between two horizontally mounted ¼″ thick steel plates. A flame obtained from a Meker or Fischer burner is adjusted by maintaining the flow of natural gas to the burner so that the flame at the point of impingement onto the lower steel plate is 1,700° F. as measured with a pyrometer. The temperature of the foam at the opposite or cold side is recorded continuously over a period of 1 hour by means of a thermocouple placed between the top of the foam and the underside of the cold plate. A foam sample is considered to have passed this test if during a 60-minute period the cold side temperature does not exceed 250° F. The apparatus is so arranged that when the 250° F. temperature is reached the test is automatically discontinued although the time required to reach the 250° F. temperature was less than 60 minutes. Of those foam samples considered to pass the test, those having relatively better thermal stability are those having the lower peak cold side temperature during the 60-minute test period.

I claim:
1. A polyurethane foam composition having improved thermal stability which is the reaction product of a mixture comprising
   (A) an organic polyisocyanate,
   (B) from about 10 to about 100 percent by weight of a compound containing a plurality of aromatic hydroxyl groups selected from the group consisting of those products represented by the formulae

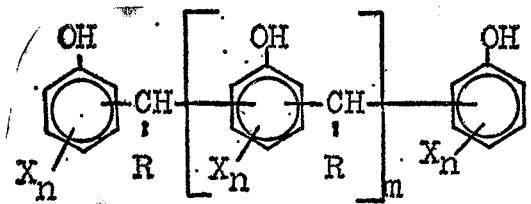

wherein R is hydrogen or an alkyl group having from 1 to 3 carbon atoms, X is hydrogen, hydroxyl, chlorine, bromine or an alkyl group having from 1 to 12 atoms, *n* is an integer from 1 to 2 and *m* has an average value from about 0.1 to about 4;

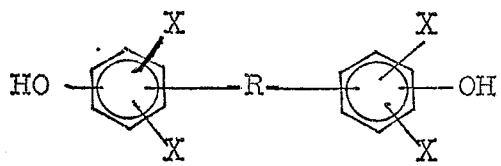

wherein R is a divalent hydrocarbon group having from about 1 to about 8 carbon atoms,

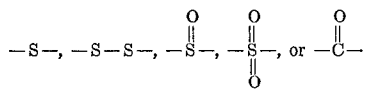

and each X is independently selected from the group consisting of hydrogen, an alkyl group having from 1 to 12 carbon atoms, chlorine and bromine; and the reaction products of a chloromethylated diphenyl ether having the general formula:

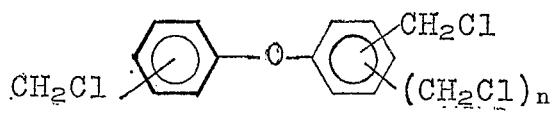

wherein *n* is an integer from 0 to 1 with a phenol having at least one hydrogen atom in the ortho or para position and represented by the general formula:

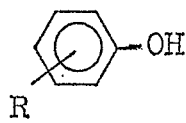

wherein R is hydrogen, chlorine, bromine, cyclohexyl, phenyl or an alkyl radical having from 1 to 12 carbon atoms; and from about 0 to about 90 percent by weight of a polyether polyol or a polyester polyol, (C) a compound selected from the group consisting of an aldehyde and a compound capable of releasing formaldehyde at about 70° C. or less selected from the group consisting of hexamethylene tetramine, tris(hydroxy-methyl) nitromethane, and cyclic and linear homopolymers of formaldehyde; said reaction product being formed in the presence of a foaming agent and wherein components (A) and (B) are present in quantities so as to provide an NCO:OH ratio of from about 0.85:1 to about 2:1 and wherein the quantity of component (C) is from about 2% to about 50% by weight based upon the combined weight of components (A) and (B).

2. A polyurethane foam of claim 1 wherein the compound containing a plurality of aromatic hydroxyl groups is present in an amount of from about 40 to about 90 percent by weight and the NCO:OH ratio is from about 1:1 to about 1.2:1.

3. The composition of claim 2 wherein component (B) is a compound represented by the formula

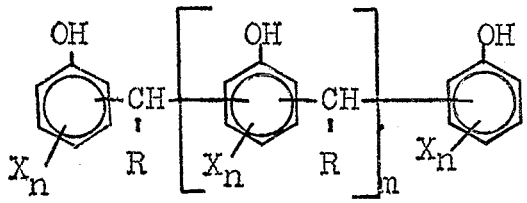

wherein R is hydrogen or an alkyl radical having from 1 to 3 carbon atoms, X is hydrogen, hydroxyl, chlorine, bromine or an alkyl group having from about 1 to about 12 carbon atoms, *n* is an integer from 1 to 2 and *m* has an average value from about 0.1 to about 4.

4. A polyurethane foam of claim 3 wherein component (B) consists of 100% by weight of the compound containing a plurality of aromatic hydroxyl groups.

5. The composition of claim 3 wherein X and R are hydrogen.

6. The composition of claim 3 wherein component (A) is polymethylenepolyphenyl isocyanate.

7. The composition of claim 6 wherein component (C) is paraformaldehyde.

8. The composition of claim 6 wherein component (C) is benzaldehyde.

9. The composition of claim 6 wherein component (C) is symmetrical trioxane.

References Cited
UNITED STATES PATENTS

| | | | |
|---|---|---|---|
| 3,632,531 | 1/1972 | Rush | 260—2.5 AM |
| 2,907,719 | 10/1959 | Greenlee | 260—2.5 AM |
| 3,137,661 | 6/1964 | Rose | 260—2.5 AM |
| 2,915,496 | 12/1959 | Swart | 260—2.5 BB |
| 3,451,953 | 6/1969 | Sambeth | 260—2.5 AM |
| 3,074,894 | 1/1963 | Loew | 260—2.5 AM |
| 3,282,896 | 11/1966 | Einberg | 260—2.5 AM |
| 3,063,964 | 11/1962 | Khawam | 260—2.5 AM |
| 2,608,536 | 8/1952 | Sterling | 260—2.5 AM |

FOREIGN PATENTS

| | | | |
|---|---|---|---|
| 269,908 | 4/1964 | Australia | 260—2.5 AM |

DONALD E. CZAJA, Primary Examiner

C. W. IVY, Assistant Examiner

U.S. Cl. X.R.

260—2.5 A, 2.5 AJ, 2.5 BB